United States Patent [19]
Porter

[11] 3,867,078
[45] Feb. 18, 1975

[54] APPARATUS FOR FORMING A GOLF BALL MOLD

[75] Inventor: Carl D. Porter, El Monte, Calif.

[73] Assignee: E. Victor Fried, Monrovia, Calif.

[22] Filed: May 7, 1973

[21] Appl. No.: 357,944

Related U.S. Application Data

[62] Division of Ser. No. 187,967, Oct. 12, 1971, Pat. No. 3,772,008.

[52] U.S. Cl................ 425/78, 425/175, 425/177, 425/443
[51] Int. Cl............................ B22f 3/00, B29c 1/00
[58] Field of Search ............ 425/78, 175, 177, 406, 425/412, 438, 443; 249/112, 116

[56] References Cited
UNITED STATES PATENTS

| | | | |
|---|---|---|---|
| 147,897 | 2/1874 | Bullard | 425/443 X |
| 259,033 | 6/1882 | Merrill | 425/443 X |
| 444,009 | 1/1891 | McDonagh | 425/443 X |
| 1,473,791 | 11/1923 | McCutcheon | 425/443 X |
| 1,822,451 | 9/1931 | Oestnaes | 249/112 |
| 2,870,484 | 1/1959 | Livingston | 425/78 X |
| 3,543,380 | 12/1970 | Hagopian | 425/177 X |
| 3,566,442 | 3/1971 | Hakala | 425/78 |

Primary Examiner—Robert L. Spicer, Jr.
Attorney, Agent, or Firm—William W. Haefliger

[57] ABSTRACT

The method of forming a concavely hemispherical mold for use in molding a gold ball, so that the mold interior surface is accurately dimpled, includes the steps.

a. placing a mass of powdered mold metal in a forming die cylinder,
b. advancing axially in the cylinder or hemispherical punch, the exterior surface of which is dimpled, and against the mass of powdered metal to consolidate that metal into mold shape with the described surface dimpling, and so that the consolidated metal embraces the punch,
c. removing from the cylinder the consolidated mold with the punch embraced thereby, and
d. thereafter effecting separation of the consolidated mold and punch by thermal expansion of the mold relative to the punch.

3 Claims, 7 Drawing Figures

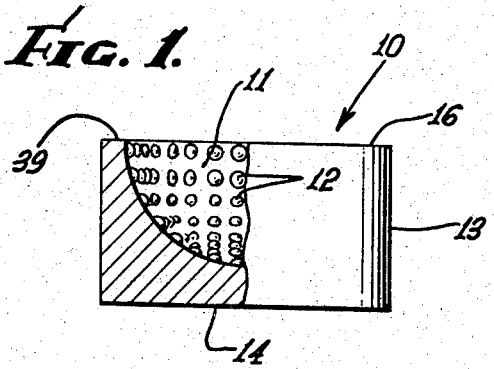
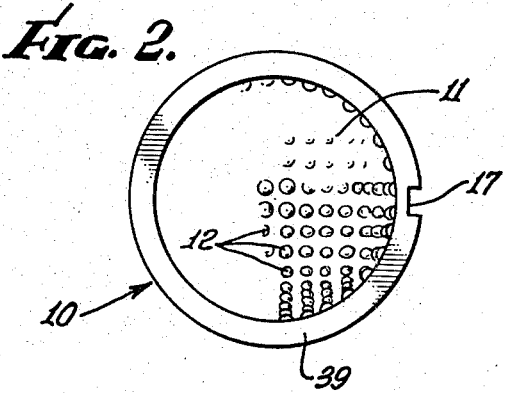
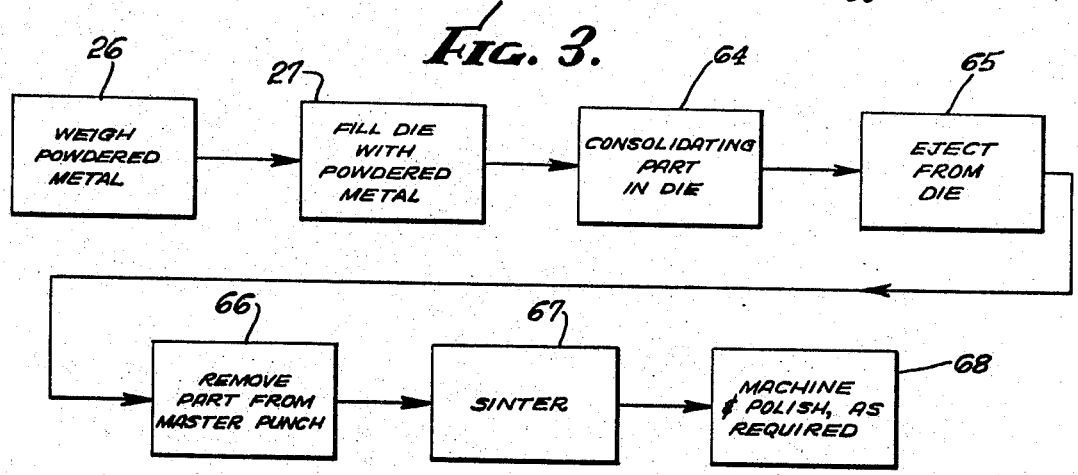
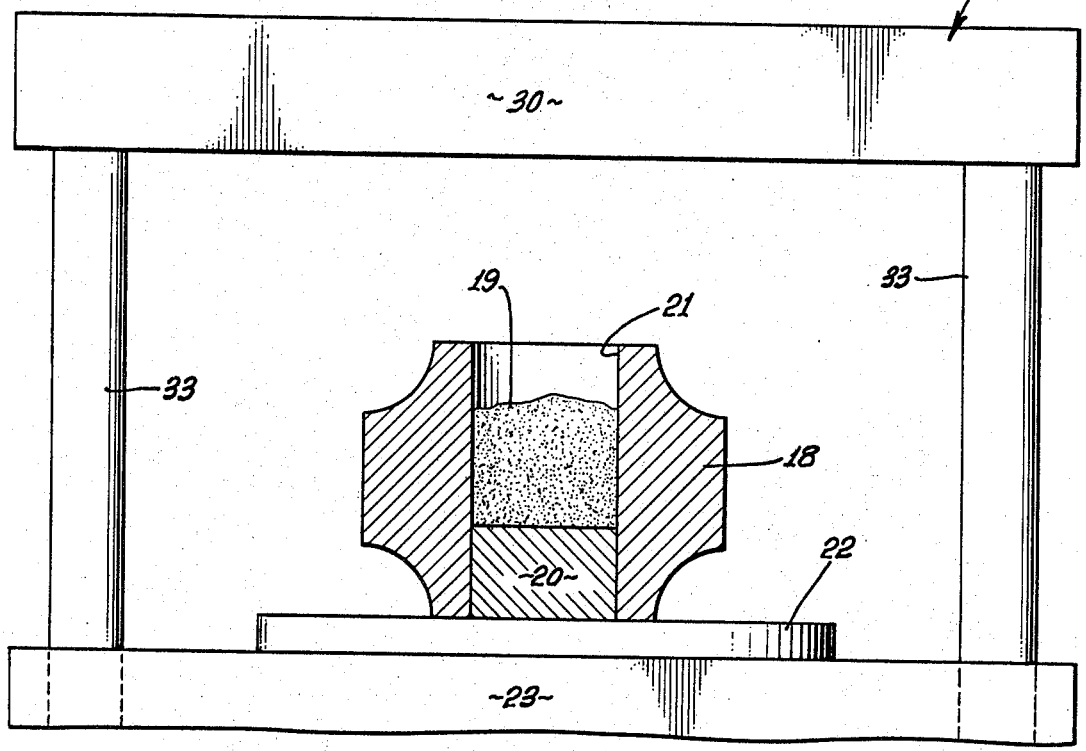

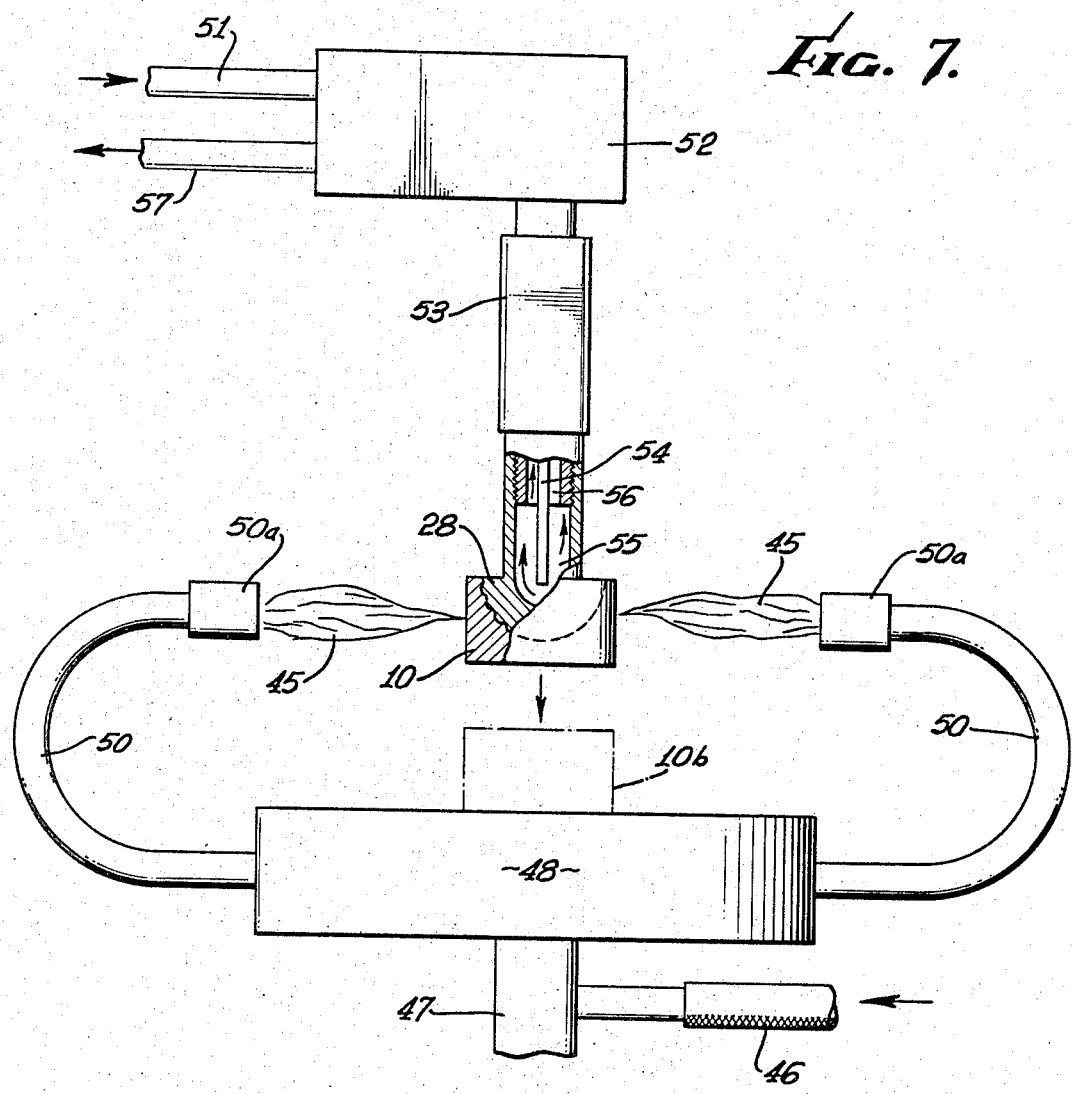

3,867,078

APPARATUS FOR FORMING A GOLF BALL MOLD

This is a division, of application Ser. No. 187,967, filed Oct. 12, 1971 now U.S. Pat. No. 3,772,008.

BACKGROUND OF THE INVENTION

This invention relates generally to golf ball production, and more particularly concerns the formation of molds for use in molding golf balls.

Golf balls molds are conventionally hemispheric in shape, two such molds, or mold "halves" being clamped together to form a complete molding unit or assembly. Inasmuch as golf ball dimensions, including those of the multiple recesses distributed over the ball surface, are not permitted to vary outside very narrow limits or tolerances (about 0.001 inch, for example), the consistant manufacture of the ball molds to such tolerances becomes exceedingly difficult and expensive. No way was known, to my knowledge, to produce such molds through consolidation of metal powder, in the simple and reliable manner as now afforded by the present invention.

SUMMARY OF THE INVENTION

It is a major object of the invention to provide apparatus and method facilitating production of golf ball molds through consolidation of metallic powder, while keeping within the tolerance limitations imposed by golf ball sizing standards. Basically, the method involves formation of a concavely hemispherical mold, the interior surface of which is accurately dimpled, with employment of a forming die cylinder and a hemispherical punch the convex exterior surface of which contains multiple recesses corresponding to the mold surface dimples. The steps of the method include placing a mass of powdered metal in the mold, and, advancing the punch axially in the cylinder and against the mass of powdered metal to consolidate that metal into mold shape with surface dimpling, and so that the consolidated metal embraces the punch; removing the consolidated mold and punch from the die cylinder; and thereafter effecting separation of the mold from the punch by thermal expansion of the mold relative to the punch. Subsequently, the separated mold is typically sintered and may be polished. As will be seen, the mold metal powder mass may consist principally of iron containing particles (as for example stainless steel particles), with the remainder of the mass consisting of copper or other metal particles to control ultimate size of the mold. For example, if it is found that the ultimate mold diameter is too large, the amount of copper may be decreased until the correct diameter is achieved.

The apparatus for forming the mold typically includes the forming die cylinder to receive the powdered metal mixture; and, a hemispherical punch having a convex exterior surface containing multiple recesses corresponding to the mold surface dimples, the punch received endwise in the cylinder for advancement axially therein and against the mass of powdered metal to consolidate the latter into mold shape with surface dimpling. Additional structure typically includes a stem integral with the punch to extend coaxially at the rear thereof, and a sleeve on and removably attached to the stem, the sleeve diameter exceeding that of the punch base, in order to form an annular shoulder on the mold. Further, cylindrical bushing may be used to support the die cylinder to receive the mold and adherent punch ejected from the die cylinder.

DRAWING DESCRIPTION

These and other objects and advantages of the invention, as well as the details of an illustrative embodiment, will be more fully understood from the following description and drawings, in which:

FIG. 1 is a side elevation, partly in section, showing a hemispherical golf ball mold;

FIG. 2 is a plan view of the FIG. 1 mold;

FIG. 3 is a bold from flow diagram, showing steps involved in the mold forming process;

FIG. 4 is a side elevation showing a press as used to form the mold;

FIG. 7 is an elevational view of equipment used to remove the consolidated mold from the pressure applying punch.

DETAILED DESCRIPTION

Figure 5:
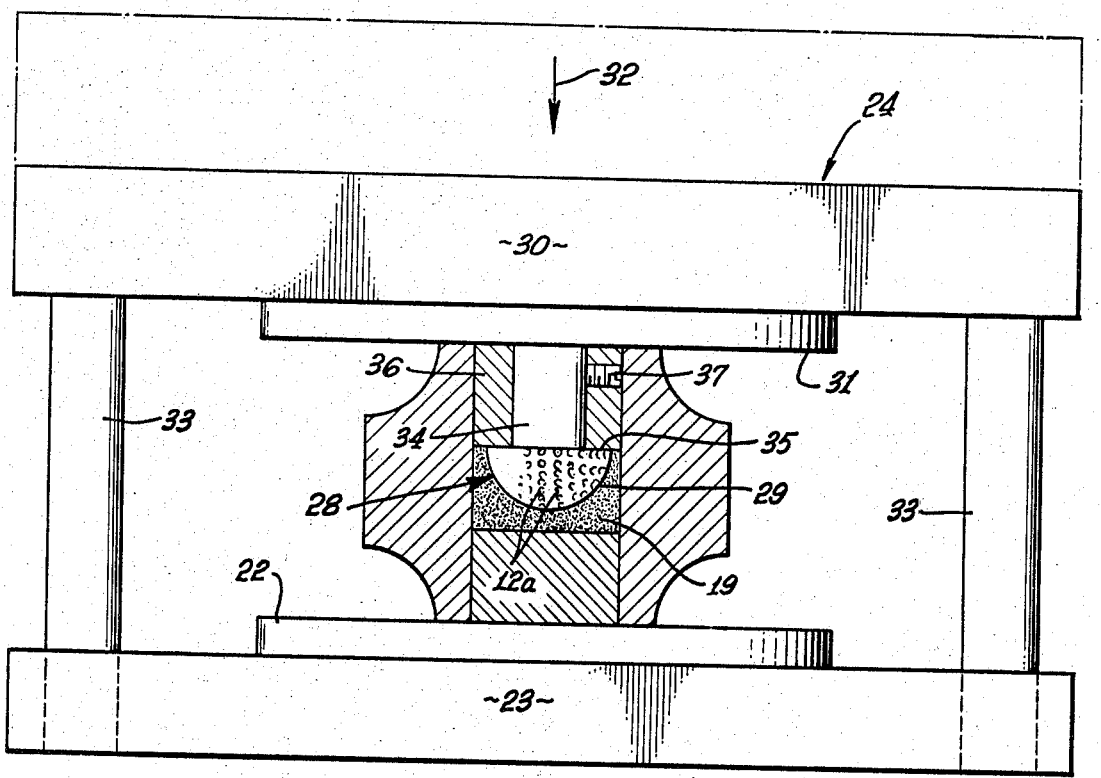
FIG. 5 is a view like FIG. 4, showing the press applying pressure to consolidate the mold.

Referring first to FIG. 1, the consolidated mold to be formed in accordance with the invention is shown at 10 as having a concavely hemispherical interior shape, with interior surface 11 accurately dimpled at 12, the dimples being generally uniformly spaced over that surface. Mold body 10 has a cylindrical exterior surface 13, and a base 14. As illustrated, the mold 10 comprises one-half of a complete mold. The two half-molds are subsequently placed end-to-end at 16 to form a complete mold for ball molding purposes. A key-way may be used, as shown at 17 in FIG. 2, for alignment of the two half-molds.

In FIG. 4, apparatus for forming the mold 10 includes a forming die cylinder 18 into which a mass 19 of powdered metal is received and typically onto a plug 20 removably contained in the cylinder to fit bore 21 thereof. The assembly rests on a hard steel plate 22 seated on platen 23 of a molding press 24. The preliminary powdered metal weighing step and the filling of the die (as seen in Fig. 4) appear at 26 and 27 in FIG. 3.

Referring to FIG. 5, showing the consolidation step, a hemispherical punch 28, has a convex esterior surface 29 which contains multiple recesses 12a corresponding to the dimples 12 in FIG. 1. The punch is received axially endwise in the cylinder 18, for advancement downwardly against the mass of particles 19, thereby to consolidate the metal into mold shape with surface dimpling as described. For this purpose, a stem 34 may be integral with the punch to extend coaxially at the upper rear thereof, so that force may be transmitted from upper platen 30 of the press to the stem and to the punch, as via hard steel plate 31. Actuator force application to the platen 30 is indicated at 32. Platen guide pins or rods appear at 33. Typical force application may be in the range 200–300 tons.

It will be noted that the base diameter of the punch in horizontal plane 35 exceeds the diameter of stem 34, to provide a stop shoulder seating a sleeve 36 removably attached to the stem as by a set screw 37. The sleeve diameter exceeds that of the punch base whereby the end 38 of the sleeve also compacts the material 19, to form the annular shoulder 39 seen in FIG. 1. Force is transmitted to the sleeve as by plate 31.

Figure 6:
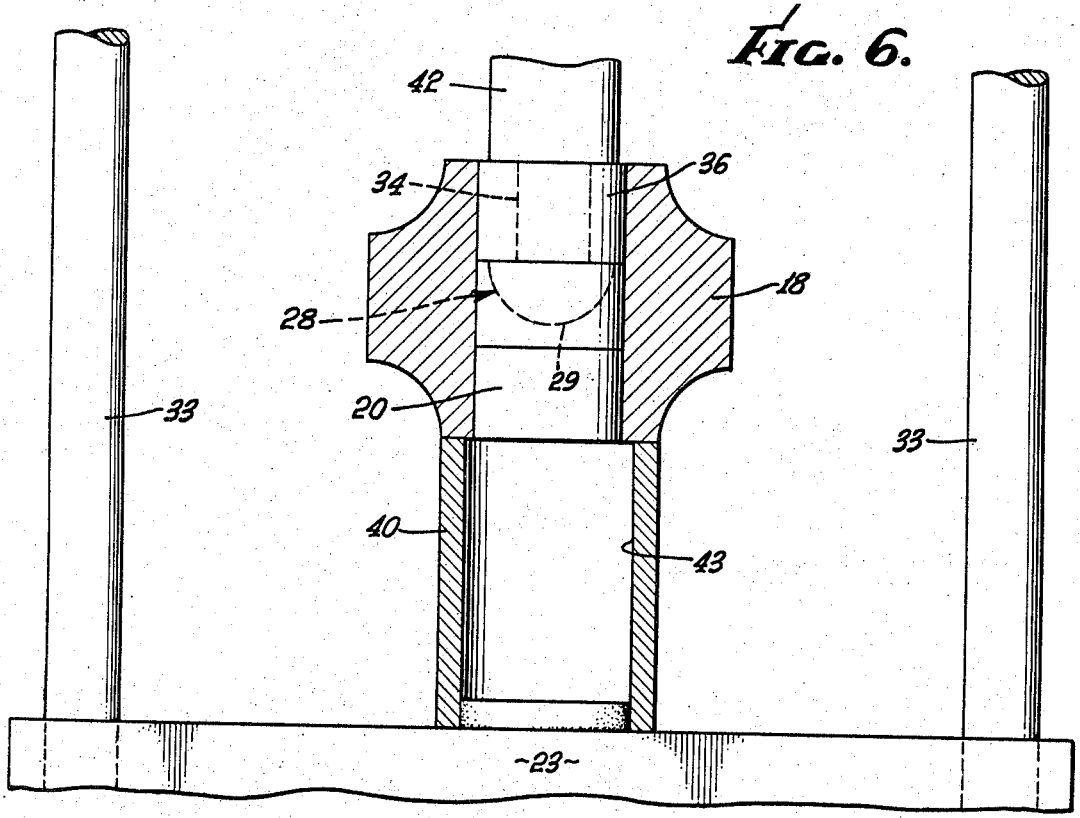
FIG. 6 is another view like FIG. 4, but showing the press in mold ejecting configuration.

FIG. 6 shows the manner in which the elements 20, 10, 28 and 36 are removed downwardly from the die 18. For this purpose, the die 18 is seated on a cylindrical bushing 40, and force is applied downwardly via platen 30 and a top plug 42 to the punch stem 34. Such force is transmitted by punch 28 and sleeve 36 to the consolidated mold part 10, ejecting same downwardly from bore of die 18 into larger bore 43 of bushing 40. The sleeve and punch are likewise ejected, and removed from the bushing.

It then become necessary to carefully separate the punch 28 from the part 10, which is embraced by meshing of the upper rows of dimples 12 on the part surface 11 with the punch surface at recesses 12a. Such separation is effected with unusual advantage, by controlled thermal expansion of the mold part 10 relative to the punch. As seen in FIG. 7, flame heating at 45 of the part 10, directed at and around opposite sides thereof, serves to effect the desired thermal separation, whereby the part 10 may then drop free of the punch, as indicated at 10b. A combustible air and gas mixture may be supplied at 46 and 47 to mainfold 48, in turn supplying the mixture to the burners or jets 50 for discharge through heads 50a. To prevent annealing of the punch, cooling fluid such as water is supplied at 51, 52 and pipe 53 to a central duct 54, the latter flowing cooling water to the hollow interior 55 of the punch and stem. Water exits via duct 56 in the stem and manifolding 53 and 52 to exit line 57.

The steps of consolidation of the part in the die, ejection from the die and removal of the part from the punch are indicated at 64–66 in FIG. 3. Thereafter, the formed mold is sintered as indicated at 67. Sintering serves to heat and change the pressed shape into a fused metal structure, without melting. Typical sintering temperature is about 2,050°F for 30 minutes for the predominantly stainless steel mold, and in a protected disassociated ammonia atmosphere. Finally, the sintered part is externally machined (circumferentially turned) and may be polished, at 68, as required.

The metal powder mass 19 may consist principally of iron containing particles (high carbon, high chrome, such as stainless steel), the remainder consisting of copper. The amount of copper controls the size of the mold, after sintering, in that the diameter of the mold (and hence the diameter of the golf ball) will increase with added copper. Typically, addition of 2½percent copper to a mass consisting of over 90 percent stainless steel particles, by weight, will increase the mold diameter by perhaps 0.003 inches. The mold may also be formed by consolidated of other commercially available compacting metal powder (aluminum, brass, bronze, etc.).

I claim:

1. Apparatus for forming a concavely hemispherical mold for use in molding one-half of a golf ball, and so that the mold interior surface is accurately dimpled, said apparatus including:
   a. a forming die cylinder to receive a mass of powdered mold metal, the cylinder having a cylindrical bore and an axis,
   b. a hemispherical punch having a convex one-half spherical exterior surface which contains multiple recesses corresponding to the mold surface dimples, the punch having an axis and being received coaxially endwise in the cylinder bore for advancement axially therein to urge said surface against the mass of powdered metal to consolidate that metal into mold shape with said surface dimpling,
   c. structure in the cylinder to confine the mass during said consolidation, said structure including a plug removably and slidably received in said bore to face endwise toward said punch surface so as to receive pressure application transmitted through the metal mass during mold consolidation, and including a stem integral with the punch to extend coaxially at the rear thereof, and a sleeve on the stem, the sleeve diameter exceeding the diameter of the punch base.

2. Apparatus as defined in claim 1 including a cylindrical bushing to support the forming cylinder, and having a bore to receive the plug and the consolidated mold during axial ejection thereof from the forming cylinder, and in response to continued axial force transmission to the consolidated mold from the punch.

3. Apparatus as defined in claim 1 including said consolidated mold between the punch die and plug.

* * * * *